United States Patent Office 2,848,744
Patented Aug. 26, 1958

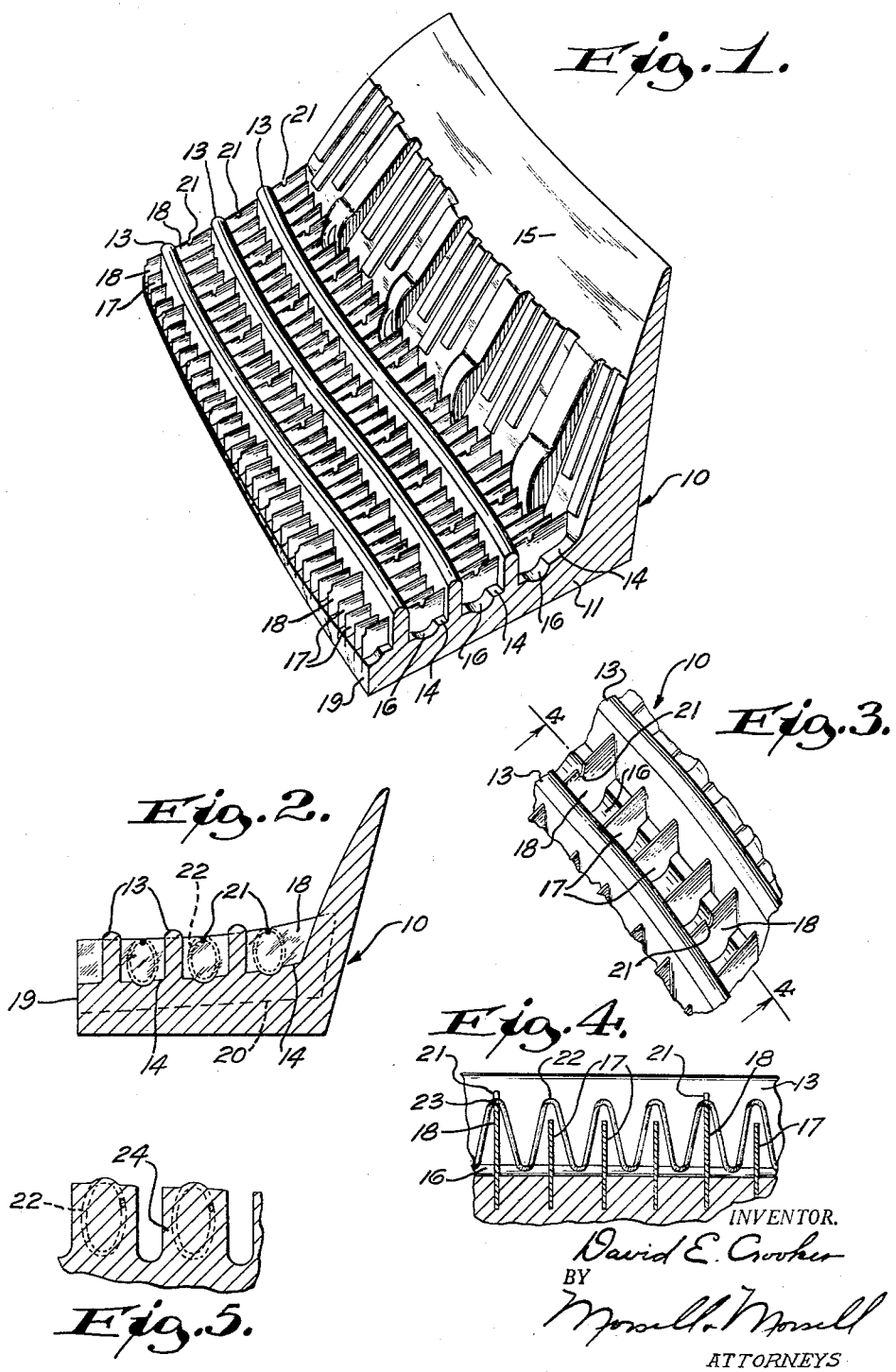

2,848,744

APPARATUS FOR AND METHOD OF FORMING TIRE TREADS

David E. Crooker, Ontonagon, Mich., assignor of one-half to Lloyd L. Felker, Marshfield, Wis.

Application November 16, 1955, Serial No. 547,144

4 Claims. (Cl. 18—44)

This invention relates to improvements in apparatus for and method of forming tire treads.

Tire treads of the type having circumferentially extending rider strips have been found to give improved traction if the rider strips are provided with a multiplicity of transverse slits known in the trade as sipes. Tire treads will also give improved traction in snow or soft mud if the rider strips are of increased height. In my copending application, there is disclosed a tire tread having rider strips of increased height, together with special traction augmenting coils of unusual shape so that a coil portion is present throughout the height of the rider strip, all of this being accomplished without increasing the width of the rider strip. The metal coils disclosed in the companion application above referred to are elongated in cross-section with the long dimension extending in the direction of the height of the rider strip. The proper holding of coils of this unusual shape during formation of the tread has produced a problem.

It is a general object of the present invention to provide an improved matrix for forming a tire tread wherein means is provided for maintaining a coil, and particularly a coil of elongated cross-section, in centered position where it can not tip during the molding process.

A further object of the invention is to provide an improved mold having means for holding coils in position as above described, and also having means for simultaneously forming sipes in the rider strips.

A further object of the invention is to provide an improved method of forming tire treads having metal coils in the rider strips thereof wherein there is an improved procedure for maintaining the coils in erect centered position in the matrix while the tire is being formed.

With the above and other objects in view, the invention consists of the improved apparatus for and method of forming tire treads and all of its parts and combinations, as set forth in the claims, and all equivalents thereof.

In the accompanying drawing, illustrating one complete embodiment of the invention, in which the same reference numerals designate the same parts in all of the views:

Fig. 1 is a fragmentary perspective view looking at the interior of one of the half sections of a matrix constructed in accordance with the present invention;

Fig. 2 is a transverse sectional view through said portion of the matrix;

Fig. 3 is a fragmentary perspective view showing a fragment of one of the rider strip forming grooves of the matrix;

Fig. 4 is a sectional view taken on the line 4—4 of Fig. 3; and

Fig. 5 is a fragmentary transverse sectional view through the tread of a tire made by use of the improved matrix.

Referring more particularly to the drawing, the numeral 10 designates a matrix generally, which matrix comprises a circular half section 11 and a co-operating circular half section for the opposite side, which is not shown, but which is the same as Fig. 1 in reverse. Formed in the interior of the matrix are spaced circumferentially extending ribs 13 to provide circumferentially extending grooves 14 therebetween, the outermost grooves being formed between the outermost rib 13 and the adjacent side wall 15 of the matrix. These grooves are adapted to form rider strips on the tire tread. For passenger car tires the groove are ½" wide. Standard passenger car rider strips are between ⅜" and ½" high. The present mold is designed to produce rider strips at least 50% higher than standard practice, and therefore the ribs 13 are higher than in conventional passenger car molds.

In the illustrated, preferred embodiment of the invention, the bottom of each of the grooves 14 is provided with an arcuate concavity 16. Each concavity extends around the entire circumference of the mold and is of less width than its groove, as is clear from Fig. 1. This groove is preferably about ¼" wide for passenger car tires.

Extending transversely of the matrix section 11 through the ribs 13 are a plurality of closely spaced thin metal sipe forming strips 17 and 18. The strips 18 are substantially higher than the strips 17. One end of each of the strips 17 and 18 is received in a suitable slot in the side wall 15. The other ends of the strips terminate at the parting line 19 of the matrix section. The edge of each of the strips 17—18 which faces the interior of the matrix is preferably concave as illustrated in Fig. 2 to more or less conform to the sectional contour of the tread to be formed. The exposed edges of the ribs 13 of the matrix project inwardly of the mold beyond the edges of the highest strips 18 as shown in Fig. 2. The opposite edges of the strips 17—18 project into the bottom of the matrix sections such a distance as to be below the bottoms of the grooves, preferably to the depth 20 illustrated.

In order to form closely spaced sipes in the rider strips of the tire, it is preferred to have the metal strips 17—18 about ¼" apart. This, therefore, creates a multiplicity of small compartments in each of the grooves. Preferably every fourth strip is one of the high strips 18 and the top of each of said strips is formed with a notch 21, at least one for each groove 14 of the mold.

In carrying out the improved method, when the coils 22, or other elongated metal traction augmenting members, which are to form the traction augmenting members in the tire, are inserted in the grooves 14, the lowermost portion of each coil is placed in a recess 16, if said recesses are present, and portions of the coil opposite the groove 16 are engaged in the notches 21 of the high strips 18 as at 23. With this arrangement it is practical to utilize coils which are elongatd in cross-section as shown in Figs. 2 and 5. The engagement with the notches 21 holds the upper portions of the coil centered and against tipping in the mold during the molding process.

Where the invention is used for retreading, the molding procedure is carried on in the usual manner, a suitably prepared tire with a layer of uncured rubber or "camelback" applied thereto being suitably placed in the mold. Under the heat and pressure of the molding operation the uncured rubber or the "camelback" flows into the grooves 14 and into the concavities 16 and around the coils 22 to conform to the matrix pattern as shown in Fig. 1. With continued application of predetermined amounts of heat and pressure for a predetermined period of time, the uncured "camelback" becomes cured. It is to be noted that during the entire curing operation the notches 21 hold the coils in erect centered position so that they are not displaced by the pressure conditions.

The metal strips 17 and 18 form closely spaced sipes transversely of each rider strip.

Thus, when the completed tire is formed the coils will be properly centered in the rider strips and there will be an equal amount of rubber stock 24 on each side of a coil, as is clear from Fig. 5. With the oval coils illustrated, it would not be possible to keep the coils in straight upright position in the mold with conventional apparatus and procedures.

While the invention has been illustrated as applied to a matrix having serpentine grooves for forming waved rider strips, the invention is also useful in molds for forming straight rider strips. In addition, the invention may be used in connection with coils of circular cross-section, but has its greatest utility in connection with coils of elongated cross-section.

The resulting tire illustrated in Fig. 5 will have a sipe between each pair of convolutions of the coil in each rider strip, and for passenger car tires these sipes will be about ¼" apart.

While in the illustrated embodiment of the invention the sipe forming strips extend completely across a matrix half section, this precise arrangement is not necessary as long as there is a sipe forming strip extending in a direction transversely of the groove and far enough across a groove to provide stock in which one of the notches 21 may be formed.

Tires produced by the present invention, with their extra height rider strips and with the closely spaced sipes, are not only useful in providing increased traction on ice, but are also very effective in snow and soft mud.

Various changes and modifications may be made without departing from the spirit of the invention, and all of such changes are contemplated as may come within the scope of the claims.

What I claim is:

1. In a mold for forming a tire tread, an annular matrix having an outer periphery and provided with at least one circumferentially extending rider-strip-forming groove having a bottom, a multiplicity of spaced sipe-forming strips extending transversely of said groove and transversely of said mold to provide a circumferentially extending row of compartments, some of said strips at longitudinally spaced intervals throughout the length of the groove projecting upwardly from said groove bottom a greater distance than others, each of said upwardly projecting strips having its projecting edge provided with a notch the bottom of which is spaced a substantial distance above the bottom of the groove for engagement with a portion of a wire traction augmenting member which is spaced above the bottom of the groove and which is of less width than a groove to hold the traction augmenting member against lateral tipping.

2. In a mold for forming a tire tread, an annular matrix having an outer periphery and provided with at least one circumferentially extending rider-strip-forming groove having a bottom, a multiplicity of spaced sipe-forming strips having projecting edges extending transversely of said groove and transversely of said mold to provide a circumferentially extending row of compartments, at least some of said strips at longitudinally spaced intervals throughout the length of the groove having their projecting edges each provided with a notch the bottom of which is spaced a substantial distance above the bottom of the groove for engagement with a portion of a wire traction augmenting member which is spaced above the bottom of the groove and which is of less width than a groove, each of said notches being substantially centered in the width of the groove to hold the traction augmenting member centered and against lateral tipping.

3. In a mold for forming a tire tread, an annular matrix having an outer periphery and provided with at least one circumferentially extending rider-strip-forming groove having a bottom and having a circumferentially extending concavity in said bottom, a multiplicity of spaced sipe-forming strips extending transversely of said groove and transversely of said mold to provide a circumferentially extending row of compartments, at least some of said strips at longitudinally spaced intervals throughout the length of the groove having projecting edges each provided with a notch substantially midway of the width of a groove for engagement with a wire traction augmenting member which is of less width than a groove to hold the upper portion of said member against tipping while the opposite portion is seated in said concavity in the bottom of the groove.

4. In a mold for forming a tire tread, an annular matrix having an outer periphery and provided with at least one circumferentially extending rider-strip-forming groove having a bottom and having a circumferentially extending concavity centered in said bottom, a multiplicity of spaced sipe-forming strips extending transversely of said groove and transversely of said mold to provide a circumferentially extending row of compartments, at least some of said strips at longitudinally spaced intervals throughout the length of the groove having projecting edges each provided with a notch for engagement with a wire traction augmenting member which is less width than a groove to hold the upper portion of said member against tipping while the opposite portion is seated in said concavity in the bottom of the groove, each notch being above the concavity and substantially centered in the width of the groove.

References Cited in the file of this patent

UNITED STATES PATENTS

| | | |
|---|---|---|
| 788,825 | Gail | May 2, 1905 |
| 1,585,279 | Brandberg | May 18, 1926 |
| 2,224,824 | Krakauer | Dec. 10, 1940 |
| 2,598,791 | Hawkinson | June 3, 1952 |
| 2,610,357 | Hawkinson | Sept. 16, 1952 |
| 2,619,678 | Crooker | Dec. 2, 1952 |
| 2,756,460 | Heintz | July 31, 1956 |